(12) United States Patent
Crum et al.

(10) Patent No.: US 6,368,688 B1
(45) Date of Patent: Apr. 9, 2002

(54) PHARMACY FORM AND LABEL

(75) Inventors: Jesse D. Crum; Merl Mercer, both of Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 0 days.

(21) Appl. No.: 09/628,492

(22) Filed: Jul. 31, 2000

(51) Int. Cl.[7] .............................. B32B 7/06; B32B 3/10
(52) U.S. Cl. ................... 428/41.8; 428/42.2; 428/42.3; 428/43; 283/81
(58) Field of Search ............................ 428/42.2, 42.3, 428/43, 41.8; 283/81

(56) References Cited

U.S. PATENT DOCUMENTS

| | | | |
|---|---|---|---|
| 3,568,829 A | * 3/1971 | Brady | ................... 283/81 |
| 5,642,906 A | 7/1997 | Foote et al. | |
| 5,855,395 A | 1/1999 | Foote et al. | |
| 5,642,906 C1 | 7/1999 | Foote et al. | |
| 6,036,231 A | 3/2000 | Foote et al. | |

* cited by examiner

*Primary Examiner*—Alexander S. Thomas
(74) *Attorney, Agent, or Firm*—Hovey Williams LLP

(57) ABSTRACT

A form having a plurality of labels includes a label section having a label ply with at a plurality of discrete labels separated from one another by lines of separation and a release ply having a strip die cut therein. The strip is oriented to connect two or more of the labels and spans the lines of separation. Preferably, two elongated parallel strips are provided each having a transverse line of weakness. The labels may be removed from the form with the strip or strips connecting the labels. The strips may be peeled away from the adhesive covered back of the labels, but because the strips cover only a small portion of the back of each label and are positioned within the borders of the labels, the labels may be applied to a substrate, such as a prescription drug container, with the strips still attached. The strips include transverse lines of weakness which permits some or all of the labels to be separated from one of the labels during removal from the form. The lines of weakness are positioned in offset relationship to the lines of weakness, whereby the remainder of the strip is within the borders of the labels and no part of the strip is visible from the upper surface of the removed labels when applied to the container or other substrate.

15 Claims, 1 Drawing Sheet

PHARMACY FORM AND LABEL

BACKGROUND OF THE INVENTION

1. Field of the Invention

This invention concerns a new and improved form for use by pharmacists in documenting prescriptions and labeling medication containers. More particularly, it is concerned with an improved pharmacy form including a plurality of integrated labels which are connected by a common, severable backing tab.

2. Description of the Prior Art

Various blank forms have been developed for printing by the pharmacist at the time a prescription for medication is filled. Among these are forms which include label sections, whereupon the pharmacist may remove or detach a plurality of labels from the form and apply them to a container. The labels may include a main label having a pressure sensitive adhesive and setting forth the patient, the physician, the date the prescription is filled, the contents of the prescription, and the directions for use. In addition, various advisory or warning labels may be supplied for bringing certain cautions to the attention of the patient, such as side effects of the drug or to warn about dangerous consequences of consuming alcohol with the medication. Patents generally addressed to such forms include U.S. Pat. Nos. 5,642,906, 5,855,395 and 6,036,231 to Foote et al., the disclosure of which is incorporated herein by reference.

While the forms disclosed therein are useful, having a form portion and a label section including a main label and a plurality of warning labels, the interconnection of the labels is accomplished by tabs in the face stock from which the labels are die cut. This requires significant quality control during manufacture, as if during cutting of the labels in the face stock the tabs are eliminated, then there is no connection between adjacent labels which would facilitate removal. On the other hand, if the tabs are more substantial than desired in numbers or thickness, then efforts to separate adjacent labels may lead to tearing of one label during separation of adjacent labels. Moreover, there may be occasions when it would be desirable to have at least a portion of the adhesive backing of the labels unexposed after removal of the main label and warning labels from the form.

SUMMARY OF THE INVENTION

These and other objects have largely been met by the pharmacy form and label of the present invention. That is to say, the pharmacy form and label hereof provides a convenient and economical alternative to the form construction where the labels are interconnected by tabs by providing die cut strips in a release liner opposite the labels, such that the strips are separated from the form upon removal of the labels. While some or a majority of the adhesive backing is exposed, the strips can also cover a portion of the adhesive back of the labels to provide a location for placement of the users fingers during separation and application. The individual labels may be imprinted on one side with indicia to provide the main label information described above or to warn, advise or caution, with pressure sensitive adhesive applied to the opposite side. The strips are die cut to span several different labels, thereby temporarily retaining them together. Preferably, the strips are perforated to enable a user to remove only the number of labels and thus the corresponding length of the strip necessary to accomplish the task at hand. Upon separation of the strip along a perforation, only a portion of a multiplicity of labels are removed, the others remaining with the main body of the form. Upon application of the adhesive coated side of the label to a substrate, such as a medication container, the strips may be peeled back if desired to adhere the labels to the substrate, or may be left in place with the labels held in position by the adhesive on the exposed surface.

These and other advantages of the label of the present invention will be readily apparent to those skilled in the art with reference to the drawings and the detailed description of the preferred embodiment set forth below.

DESCRIPTION OF THE PREFERRED EMBODIMENT

Figure 1:
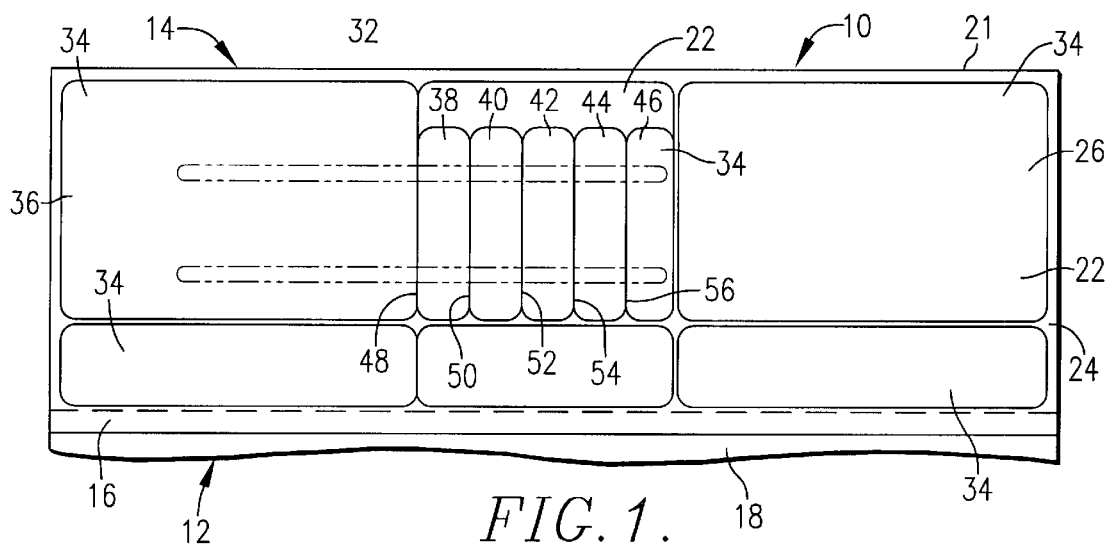
FIG. 1 is a fragmentary front elevational view of the pharmacy form and label of the present invention, showing the labels as a part of a form on which information may be recorded.

Referring now to the drawing, a pharmacy form 10 in accordance with the present invention includes a main sheet section 12 and a label section 14. The main sheet section 12 is connected to the label section by adhesive placed along an overlap area 16. The adhesive may be a temporary adhesive if it is desired to fully separate the label section 14 from the main sheet section 12, or alternatively a stronger, more permanent adhesive if it the label section is to be retained with the main sheet section 12.

In greater detail, the main sheet section 12 is typically of imprintable paper and has a front side 18 and a back side 20, either of which may be provided with preprinted indicia or where indicia may be printed thereon at the time of use. For example, various indicia concerning the pharmacy or general information about prescription medication in general can be preprinted on either side 18 or 20 during manufacture of the form. Thereafter, when a specific medication is to be dispensed by the pharmacist, additional information can be printed by using a printer such as a laser, ink-jet or other printer connected to a computer, or the pharmacist may simply type or handwrite information onto the main sheet. If desired, the main sheet section 12 may be perforated into various separable component sections or a transverse perforation along the width of the main sheet section 12 may be provided if separation from the label section 14 is desired.

The label section 14 has a surrounding margin 21 and is provided with a face stock ply 22 and a liner ply 24. Preferably, the face stock ply 22 is imprintable paper or synthetic resin and has an upper surface 26 which may be printed with indicia and a back surface 28 covered with a pressure-sensitive adhesive. The liner ply 24 is typically paper and has a rear surface 30 which is uncoated and may be imprinted, if desired, and a release surface 32 to which a silicone release coating is applied.

The face stock ply 22 is die cut during manufacture into a plurality of labels 34, which may be of different sizes as illustrated, with at least some of the labels connected to each other only by their common adhesive attachment to the liner ply 24. Thus, the labels 34 may be surrounded by a die cut line of separation from the other labels. The labels 34 include a discrete main label 36 and a plurality of discrete secondary labels 38, 40, 42, 44 and 46. While the secondary labels may be varied in dimension, they preferably have a common dimension and one secondary label 38 is positioned adjacent main label 36, while the labels 40, 42, 44 and 46 are side-by-side in alignment, thereby enabling a line to extend from the main label 36 to the most remote label 46 thereto, such line necessarily crossing each of the other secondary labels 38, 40, 42 and 44. Thus, the die cutting of the discrete labels in the face stock ply 22 results in a line of separation 48 between the main label 36 and the adjacent secondary label 38. Similarly, line of separation 50 is parallel to line of separation 48 and separates secondary label 38 from its adjacent secondary label 40, line of separation 52 is parallel to both lines of separation 48 and 50 and separates secondary label 40 from its adjacent secondary label 42, line of separation 54 is parallel to line of separation 52 and separates secondary label 42 from its adjacent secondary label 44, and line of separation 56 is parallel to line of separation 54 and separates secondary label 46 from its adjacent secondary label 44.

The liner ply 24 is preferably die cut to provide two elongated strips 58 and 60, each surrounded and defined by die cuts 62 and 64, respectively. The strips 58 and 60 have longitudinal axes A and are oriented in parallel, spaced apart relationship. The strips 58 and 60 are preferably positioned on the liner ply 24 opposite the main label and the secondary labels to lie inboard of the surrounding margin 21 of the label section 14. By employing two discrete strips 58 and 60, the main label 36 and desired number of secondary labels may remain connected even if one of the strips is inadvertently torn or removed, and additionally the use of two strips 58 and 60 aids in maintaining alignment of the secondary labels. Lines of weakness 66, 68, 70, 72 and 74 extending transversely across the elongated strips 58 and 60 are provided by perforation or scoring in the strips 58 and 60 and correspond to but are not in registry with the lines of separation 48, 50, 52, 54, and 56. By offsetting the lines of weakness in the strips 58 and 60 cut in the liner ply 24 relative to the corresponding lines of weakness, the desired number of secondary labels may be removed without and excess portion of the strip extending laterally from the last of the secondary labels removed from the form.

Figure 2:
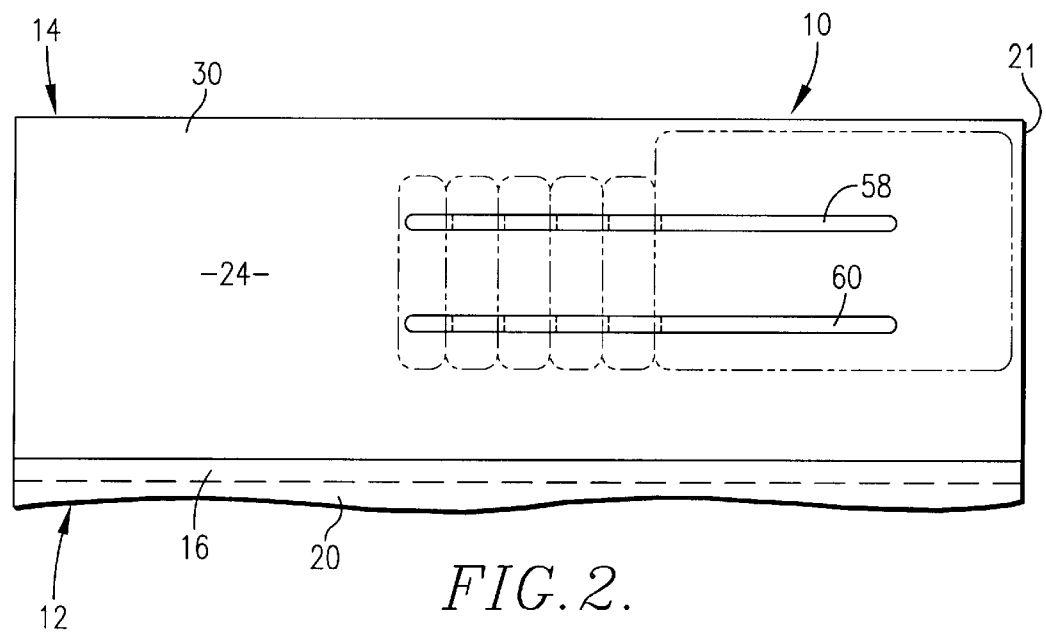
FIG. 2 is a fragmentary rear elevational view of the pharmacy form and label hereof, showing the die cut transverse strips in the release liner and the perforations thereacross.
Figure 3:
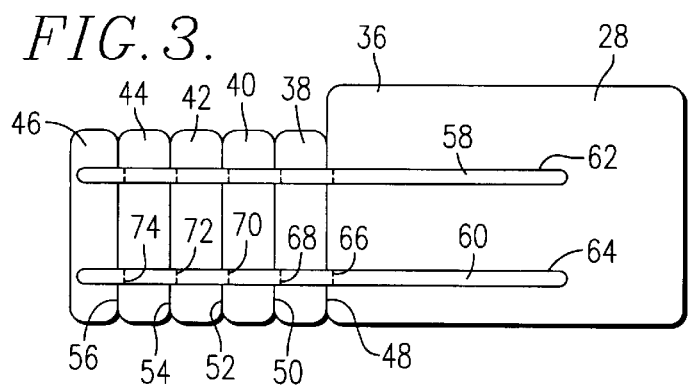
FIG. 3 is a rear elevational view of the labels of the present invention connected by the die cut strips after removal from the form.

In use, the forms 10 are typically inserted into the printer of a computer where information can be imprinted on the front side 18 and the upper surface 26 of the main sheet section 12 and the label section 14, with the information thus printed being capable of being stored in the memory of the computer. Of course, the information can also be typed or handwritten if desired. After printing, the pharmacist may remove the main label 36 and one or more secondary labels 38, 40, 42, 44 and 46. While the labels may be removed and placed individually if desired by the pharmacist, the provision of the strips 58 and 60 connects the main label 36 and the secondary labels 38, 40, 42, 44 and 46 so that they may be simultaneously be removed from the form 10 as shown in FIG. 3. Alternatively, the user may grasp the label section 14 in such a manner that one or more of the secondary labels is pinched between the thumb and forefinger of one hand (the right hand as illustrated in the orientation of the form 10 shown in FIG. 1 through FIG. 3) while the main label 36 and other desired secondary labels are lifted from the label section 14. This causes the strips 58 and 60 to tear along a line of weakness adjacent the grasped secondary label, so that only the desired number of warning labels is removed. Because of the positioning of the lines of weakness offset to the lines of separation and more proximate the main label 36 than the lines of separation, no "tail" or excess portion of the strips 58 and 60 remain. Because the majority of the adhesive on the back surface 28 is exposed, the main label 36 and desired number of secondary labels may be readily attached without the necessity of removing the strips 58 and 60. Of course, since the strips 58 and 60 are part of the liner ply having a release coating facing the adhesive, the strips 58 and 60 may be readily peeled from the removed labels and the labels then individually applied.

Although preferred forms of the invention have been described above, it is to be recognized that such disclosure is by way of illustration only, and should not be utilized in a limiting sense in interpreting the scope of the present invention. Various modifications may be made to the form 10 in accordance with the present invention, including providing materials such as synthetic resin for the liner ply 24 and main sheet section 14, and providing perforations to segregate the main sheet section 14 into separable subsections. A single strip could be provided instead of the two strips, and further the width of the strips 58 and 60 could be increased relative to the size of the labels in order to provide a region where the user could place his thumb, etc. without contacting any adhesive on the labels. Such modifications, and others, will be readily apparent to those skilled in the art after reviewing the disclosure hereof and could be made without departing from the spirit of the invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A form for imprinting labels, said form including:
   a main sheet section having a front side and a back side; and
   a label section including a face ply and a liner ply positioned adjacent said main sheet section,
      said face ply having a plurality of labels, each of said labels having an upper surface and a back surface provided with an adhesive thereon, said liner ply having a release surface having a release coating applied thereon and oriented in facing relationship to said labels,
      at least some of said labels being adjacent but separate and discrete from one another and separated by at least one line of separation therebetween,
      said liner ply including at least one strip which is die cut and separable from the remainder of said liner ply, said strip being oriented opposite said some of said labels whereby said strip spans said line of separation and connects said some of said labels upon simultaneous removal of said strip and said some of said labels from said form,
      wherein said one strip has a longitudinal axis and is provided with at least one line of weaknes transverse to the longitudinal axis of the strip.

2. A form for imprinting labels as set forth in claim 1, including a second elongated strip oriented substantially in parallel spaced relationship to said one elongated strip and positioned opposite said some of said labels in spanning relationship to said line of separation.

3. A form for imprinting labels as set forth in claim 1, wherein said one strip is positioned inboard of the surrounding margin of said label section.

4. A form for imprinting labels as set forth in claim 1, wherein said at least one line of weakness is positioned parallel to but offset from said line of separation between said labels.

5. A form for imprinting labels as set forth in claim 4, wherein said line of weakness is provided by perforation.

6. A form for imprinting labels, said form including:
   a main sheet section having a front side and a back side; and
   a label section including a face ply and a liner ply positioned adjacent said main sheet section,
      said label face ply having a plurality of labels, each of said labels having an upper surface and a back surface provided with an adhesive thereon, said liner ply having a release surface having a release coating applied thereon and oriented in facing relationship to said labels,
      at least some of said labels being adjacent but separate and discrete from one another and separated by at least one line of separation therebetween,
      said liner ply including at least one strip which is die cut and separable from the remainder of said liner ply, said strip being oriented opposite said some of said labels whereby said strip spans said line of separation and connects said some of said labels upon simultaneous removal of said strip and said some of said labels from said form,
      wherein said some of said labels includes a discrete main label and a plurality of smaller discrete secondary labels, each of said some of said labels being in linear alignment, said main label and said secondary labels being separated from each other by lines of separation, and including a second elongated strip oriented substantially in parallel, spaced relationship to said one elongated strip, said one strip and said second strip being positioned in spanning relationship across said lines of separation to releasably adhere to said main label and said plurality of secondary labels.

7. A form for imprinting labels as set forth in claim 6, wherein said strips extend along a longitudinal axis and including a plurality of lines of weakness oriented transversely to said longitudinal axis adjacent but offset to said lines of separation between said some of said labels.

8. A form for imprinting labels, said form including:
   a main sheet section having a front side and a back side; and
   a label section having a surrounding margin and including a face ply and a liner ply positioned adjacent said main sheet section,
      said face ply having a plurality of labels, each of said labels having an upper surface and a back surface provided with an adhesive thereon, and a liner ply having a release surface having a release coating applied thereon and oriented in facing relationship to said labels,
      at least some of said labels being adjacent but defined by cuts to be separate and discrete from one another and separated by at least one line of separation therebetween,
      said liner ply including at least one strip defined by a die cut located entirely interior to and discrete from the surrounding margin whereby said at least one strip is interior to said surrounding margin and separable from the remainder of said liner ply, said strip being oriented opposite said some of said labels whereby said strip spans said line of separation and connects said some of said labels upon simultaneous removal of said strip and said some of said labels from said form.

9. A form for imprinting labels as set forth in claim 8, including a second elongated strip defined by a surrounding die cut in said liner ply and located entirely interior to and discrete from the surrounding margin whereby said at least one strip is interior to said surrounding margin and separable from the remainder of said liner ply, said second elongated strip being oriented substantially in parallel spaced relationship to said one elongated strip and positioned opposite said some of said labels in spanning relationship to said line of separation.

10. A form for imprinting labels as set forth in claim 8, wherein said one strip has a longitudinal axis and is provided with at least one line of weaknes transverse to the longitudinal axis of the strip.

11. A form for imprinting labels as set forth in claim 10, wherein said at least one line of weakness is positioned parallel to but offset from said line of separation between said labels.

12. A form for imprinting labels as set forth in claim 11, wherein said line of weakness is provided by perforation.

13. A form for imprinting labels as set forth in claim 8, wherein said some of said labels includes a discrete main label and a plurality of smaller discrete secondary labels, each of said some of said labels being in linear alignment, said main label and said secondary labels being separated from each other by lines of separation, and including a second elongated strip oriented substantially in parallel, spaced relationship to said one elongated strip, said one strip and said second strip being positioned in spanning relationship across said lines of separation to releasably adhere to said main label and said plurality of secondary labels.

14. A form for imprinting labels as set forth in claim 13, wherein said strips extend along a longitudinal axis and including a plurality of lines of weakness oriented transversely to said longitudinal axis adjacent but offset to said lines of separation between said some of said labels.

15. A form for imprinting labels as set forth in claim 8, wherein said die cut defining said strip is opposite to said some of said labels, whereby said adhesive on said back surface of said some of said labels is positioned in surrounding relationship to said strip.

* * * * *